(12) United States Patent  (10) Patent No.: US 8,774,809 B2
Son et al.  (45) Date of Patent: Jul. 8, 2014

(54) ELECTRONIC DEVICE AND OPERATING METHOD THEREOF

(75) Inventors: Juhyung Son, Seoul (KR); Jihoon Cho, Seoul (KR); Byoungwook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 13/522,314

(22) PCT Filed: Nov. 30, 2010

(86) PCT No.: PCT/KR2010/008530
§ 371 (c)(1),
(2), (4) Date: Jul. 13, 2012

(87) PCT Pub. No.: WO2011/087210
PCT Pub. Date: Jul. 21, 2011

(65) Prior Publication Data
US 2012/0289154 A1  Nov. 15, 2012

Related U.S. Application Data

(60) Provisional application No. 61/295,157, filed on Jan. 14, 2010.

(51) Int. Cl.
*H04W 36/00* (2009.01)
(52) U.S. Cl.
USPC ............ 455/436; 455/439; 455/444; 370/331
(58) Field of Classification Search
USPC .......... 455/436, 439, 444, 443, 440; 370/331, 370/335
See application file for complete search history.

(56) References Cited

U.S. PATENT DOCUMENTS

| 4,670,899 A * | 6/1987 | Brody et al. ................. 455/453 |
| 7,092,709 B1 * | 8/2006 | Honkala et al. ............ 455/432.1 |
| 8,331,318 B2 * | 12/2012 | Zhu ................................ 370/331 |
| 8,565,210 B2 * | 10/2013 | Cho et al. ....................... 370/343 |
| 8,630,604 B2 * | 1/2014 | Kung et al. .................... 455/331 |
| 2008/0108365 A1 * | 5/2008 | Buddhikot et al. ......... 455/452.1 |
| 2008/0212542 A1 * | 9/2008 | Kung et al. .................... 370/336 |
| 2011/0310839 A1 * | 12/2011 | Kenington et al. ........... 370/331 |
| 2012/0257549 A1 * | 10/2012 | Chin et al. .................... 370/280 |
| 2014/0018082 A1 * | 1/2014 | Cheng et al. .................. 455/444 |

FOREIGN PATENT DOCUMENTS

| JP | 2006-174423 | 6/2006 |
| JP | 2006-311139 | 11/2006 |
| JP | 2009-207069 | 9/2009 |
| KR | 1020050044220 | 5/2005 |
| KR | 1020050079408 | 8/2005 |
| KR | 1020090133134 | 12/2009 |

OTHER PUBLICATIONS

Japan Patent Office Application Serial No. 2012-548873, Office Action dated Oct. 31, 2013, 2 pages.

* cited by examiner

*Primary Examiner* — Minh D Dao
(74) *Attorney, Agent, or Firm* — Lee, Hong, Degerman, Kang & Waimey

(57) ABSTRACT

The present invention relates to an electronic device and a method of operating the electronic device. There are provided an electronic device and a method of operating the electronic device that may more effectively resolve handover request collisions by using a specific field value included in a handover request message.

22 Claims, 20 Drawing Sheets

Figure 8
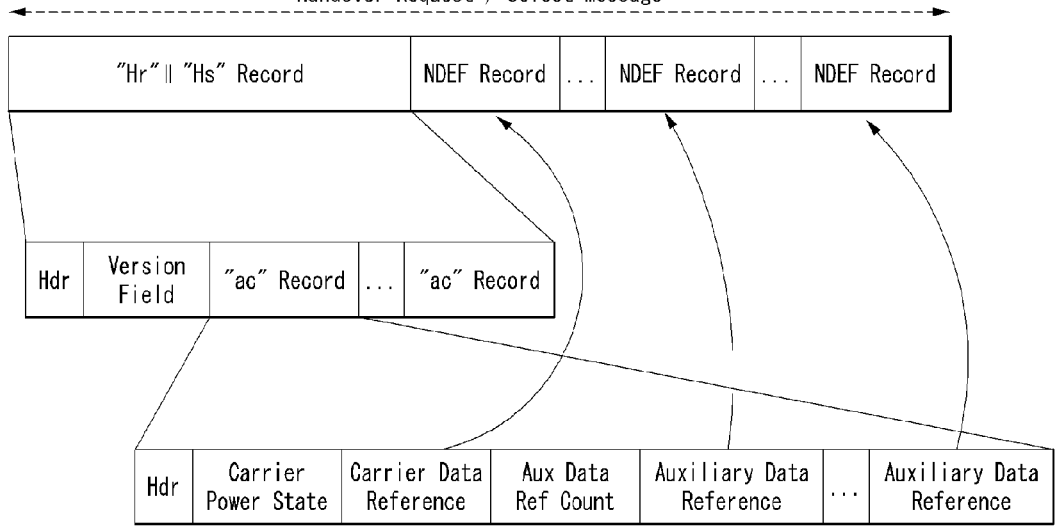
Figure 9
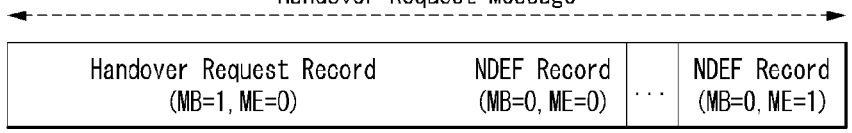
Figure 10
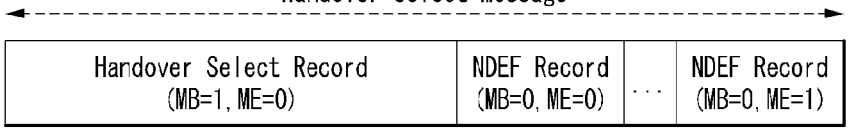
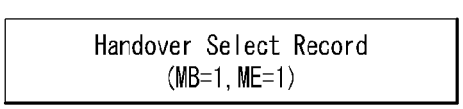

Figure 16

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hr" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1 "active") |
| 12 | 0x01 | 1 | Carrier Data Reference Length (1 byte) |
| 13 | 0x30 | 1 | Carrier Data Reference |
| 14 | 0x00 | 1 | Auxiliary Data Reference Count (0) |
| 15 | 0x5A | 1 | NDEF record header (TNF=0x01, SR=1, MB=0, ME=1, IL=1) |
| 16 | 0x02 | 1 | Record type length (2 byte) |
| 17 | 0x19 | 1 | Payload length (25 byte) |
| 18 | 0x01 | 1 | Payload ID length (1 byte) |
| 19 | 0x48, 0x63 | 2 | Record type: "Hc" |
| 21 | 0x30 | 1 | Payload ID "0" |
| 22 | 0x02 | 1 | Carrier Type Format CTF=0x02 |
| 23 | 0x17 | 1 | Carrier Type Length (23 byte) |
| 24 | "application/vnd.wfa.wsc" | 23 | Carrier Type |

Figure 18

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hs" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1), active |
| 12 | 0x01 | 1 | Carrier Data Reference Length (1 byte) |
| 13 | 0x30 | 1 | Carrier Data Reference "0" |
| 14 | 0x00 | 1 | Auxiliary Data Reference Count (0) |
| 15 | 0x5A | 1 | NDEF record header (TNF=0x02, SR=1, MB=0, ME=1, IL=1) |
| 16 | 0x17 | 1 | Record type length (23 byte) |
| 17 | 0x42 | 1 | Payload length (66 byte) |
| 18 | 0x01 | 1 | Payload ID length (1 byte) |
| 19 | "application/vnd.wfa.wsc" | 23 | Record type |
| 42 | 0x30 | 1 | Payload ID "0" |
| 43 | 0x104A | 2 | WPS Attribute Type: Version |
| 45 | 0x0001 | 2 | Version Length: 1 byte |
| 47 | 0x10 | 1 | Version=1.0 |
| 48 | 0x100E | 2 | WPS Attribute: Credential |
| 50 | 0x0039 | 2 | Credential Length: 57 byte |
| 52 | 0x1026 | 2 | WPS Attribute: Network Index |
| 54 | 0x0001 | 1 | Network Index Length: 1 byte |
| 56 | 0x10 | 2 | Network Index=1 |
| 57 | 0x1045 | 2 | WPS Attribute: SSID |
| 59 | 0x0008 | 8 | SSID Length: 8 byte |
| 61 | "Home WLAN" | 2 | SSID="HomeWLAN" |
| 69 | 0x1003 | 2 | WPS Attribute: Authentication Type |
| 71 | 0x0002 | 2 | Authentication Type Length: 2 byte |
| 73 | 0x0020 | 2 | Authentication Type: WPA2PSK |
| 75 | 0x100F | 2 | WPS Attribute: Encryption Type |
| 77 | 0x0002 | 2 | Encryption Type Length: 2 byte |
| 79 | 0x0008 | 2 | Encryption Type: AES |
| 81 | 0x1027 | 2 | WPS Attribute: Network Key |
| 83 | 0x000E | 2 | Network Key Length: 14 byte |
| 85 | "MyPreSharedKey" | 14 | Network Key="MyPreSharedKey" |
| 99 | 0x1020 | 2 | WPS Attribute: MAC Address |
| 101 | 0x0006 | 2 | MAC Address Length: 6 byte |
| 103 | 00:07:E9:4C:A8:1C | 6 | MAC Address |

Figure 20

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hr" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1 "active") |
| 12 | 0x01 | 1 | Carrier Data Reference Length (1 byte) |
| 13 | 0x30 | 1 | Carrier Data Reference "0" |
| 14 | 0x00 | 1 | Auxiliary Data Reference Count (0) |
| 15 | 0x5C | 1 | NDEF record header (TNF=0x04, SR=1, MB=0, ME=1, IL=1) |
| 16 | 0x10 | 1 | Record type length (16 byte) |
| 17 | 0x31 | 1 | Payload length (49 byte) |
| 18 | 0x01 | 1 | Payload ID length (1 byte) |
| 19 | "bluetooth.org:sp" | 16 | Record type |
| 35 | 0x30 | 1 | Payload ID "0" |
| 36 | 0x0031 | 2 | Bluetooth OOB Data Length (49 byte) |
| 38 | 01:07:80:80:bf:A1 | 6 | Bluetooth Device Address |
| 44 | 0x04 | 1 | EIR Data Length (4 byte) |
| 45 | 0x0D | 1 | EIR Data Type: Class of Device |
| 46 | 08:06:20 | 3 | Camera Device |
| 49 | 0x11 | 1 | EIR Data Length (17 byte) |
| 50 | 0x0E | 1 | EIR Data Type |
| 51 | 01:02:03:04:05:06:07:08: 09:10:11:12:13:14:15:16 | 16 | Simple Pairing Hash C |
| 67 | 0x11 | 1 | EIR Data Length (17 byte) |
| 68 | 0x0F | 1 | EIR Data Type |
| 69 | 01:02:03:04:05:06:07:08: 09:10:11:12:13:14:15:16 | 16 | Simple Pairing Randomizer R |

Figure 22

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hs" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1), active |
| 12 | 0x01 | 1 | Carrier Data Reference Length (1 byte) |
| 13 | 0x30 | 1 | Carrier Data Reference "0" |
| 14 | 0x00 | 1 | Auxiliary Data Reference Count (0) |
| 15 | 0x5C | 1 | NDEF record header (TNF=0x04, SR=1, MB=0, ME=1, IL=1) |
| 16 | 0x10 | 1 | Record type length (16 byte) |
| 17 | 0x31 | 1 | Payload length (49 byte) |
| 18 | 0x01 | 1 | Payload ID length (1 byte) |
| 19 | "bluetooth.org:sp" | 16 | Record type |
| 35 | 0x30 | 1 | Payload ID "0" |
| 36 | 0x0031 | 2 | Bluetooth OOB Data Length (49 byte) |
| 38 | 01:07:80:80:bf:01 | 6 | Bluetooth Device Address |
| 44 | 0x04 | 1 | EIR Data Length (4 byte) |
| 45 | 0x0D | 1 | EIR Data Type: Class of Device |
| 46 | 04:06:08 | 3 | Printer Device |
| 49 | 0x11 | 1 | EIR Data Length (17 byte) |
| 50 | 0x0E | 1 | EIR Data Type |
| 51 | 01:02:03:04:05:06:07:08: 09:10:11:12:13:14:15:16 | 16 | Simple Pairing Hash C |
| 67 | 0x11 | 1 | EIR Data Length (17 byte) |
| 68 | 0x0F | 1 | EIR Data Type |
| 69 | 01:02:03:04:05:06:07:08: 09:10:11:12:13:14:15:16 | 16 | Simple Pairing Randomizer R |

Figure 26

```
HTTP/1.1 200  OK
CACHE-CONTROL:max-age:1800
LOCATION:  http"//192.168.0.10:8080/description.xml
SERVER:  Linux/2.6.22.5 UPnP/1.0 PrinterScanner/1.2
USN:   uuid:622addb0-522f-11dc-8314-0800200c9a66::upnp:rootdevice
USN:   uuid:622addb0-522f-11dc-8314-0800200c9a66::\
urn:schemas-upnp-org:device:Basic:1.0
USN:   uuid:753e0be8-522f-11dc-8314-0800200c9a66::\
urn:schemas-upnp-org:device:Printer:1
USN:   uuid:18d098fa-5230-11dc-8314-0800200c9a66::\
urn:schemas-upnp-org:device:Scanner:1
USN:   uuid:753e0be8-522f-11dc-8314-0800200c9a66::\
urn:schemas-upnp-org:service:PrintEnhanced:1
USN:   uuid:18d098fa-5230-11dc-8314-0800200c9a66::\
urn:schemas-upnp-org:service:Scan:1
```

ELECTRONIC DEVICE AND OPERATING METHOD THEREOF

CROSS-REFERENCE TO RELATED APPLICATIONS

This application is the national Stage filing under 35 U.S.C. 371 of International Application No. PCT/KR2010/008530, filed on Nov. 30, 2010, which claims the benefit of U.S. Provisional Application Ser. No. 61/295,157, filed on Jan. 14, 2010, the contents of which are all incorporated by reference herein in their entirety.

TECHNICAL FIELD

The present invention relates to an NFC electronic device that may form an NFC link and a method of operating the NFC electronic device. More specifically, the present invention relates to a hand over method of switching an NFC link formed between NFC electronic devices to an alternative communication link.

BACKGROUND ART

NFC (Near Field Communication, hereinafter "NFC") is a very short-range contactless data transfer technology associated with RFID (radio frequency identification) and may be used for communication with devices within a distance of 10 cm or less (preferably, 4 cm or less).

NFC employs a center frequency of 13.56 MHz and may provide a transmission rate of 106, 212, 424 kbps. NFC may be compatible with various contactless communication protocols, such as, for example, protocols defined in ISO 14443 type A, B, and F and ISO 18092.

NFC may have various applications, such as home networking, smart poster, or bus ticketing.

An NFC-supported electronic device may communicate with other NFC-supported electronic devices through at least one of, e.g., a reader mode, a card emulation mode, and a peer-to-peer mode.

DISCLOSURE

Technical Problem

An object of the present invention is to provide an electronic device that may effectively solve collisions that may occur upon handover for switching an NFC link to an alternative communication link and a method of operating the electronic device.

Objects of the present invention are not limited thereto, and other objects may be apparent to those skilled in the art from the description taken in conjunction with the accompanying drawings.

Technical Solution

According to a first aspect of the present invention, a method of resolving a handover collision of a first electronic device includes the steps of transmitting through a first communication link to a second electronic device a first handover request message to request formation of a second communication link that has a different type from the type of the first communication link, receiving from the second electronic device through the first communication link a second handover request message to request formation of a third communication link that has a different type from the type of the first communication link before receiving a first response message in response to the first handover request message, and determining whether to transmit a second response message to the second electronic device in response to the second handover request message.

According to a first aspect of the present invention, a first electronic device includes a controller, one or more alternative communication means, and a communication unit, wherein the controller transmits through a first communication link formed through the communication unit to a second electronic device a first handover request message to request formation of a second communication link that has a different type from the type of the first communication link, and when receiving from the second electronic device through the first communication link a second handover request message to request formation of a third communication link that has a different type from the type of the first communication link before receiving a first response message in response to the first handover request message, determines whether to transmit a second response message to the second electronic device in response to the second handover request message.

Advantageous Effects

The electronic device and the method of operating the same according to the present invention may effectively resolve collisions that occur during the course of handover.

DESCRIPTION OF DRAWINGS

FIG. 8 illustrates a structure of a handover message according to an embodiment of the present invention.

FIG. 9 illustrates an example of a handover request message according to an embodiment of the present invention.

FIG. 10 illustrates an example of a handover selection message according to an embodiment of the present invention.

FIG. 16 illustrates a binary content of the Wi-Fi handover request message according to an embodiment of the present invention.

FIG. 18 illustrates a binary content of a handover selection message according to an embodiment of the present invention.

FIG. 20 illustrates a binary content of a Bluetooth handover request message according to an embodiment of the present invention.

FIG. 22 illustrates a binary content of a Bluetooth handover request message according to an embodiment of the present invention.

FIG. 26 illustrates additional data of a handover selection message utilizing additional data according to a second embodiment of the present invention.

BEST MODE

Figure 1:
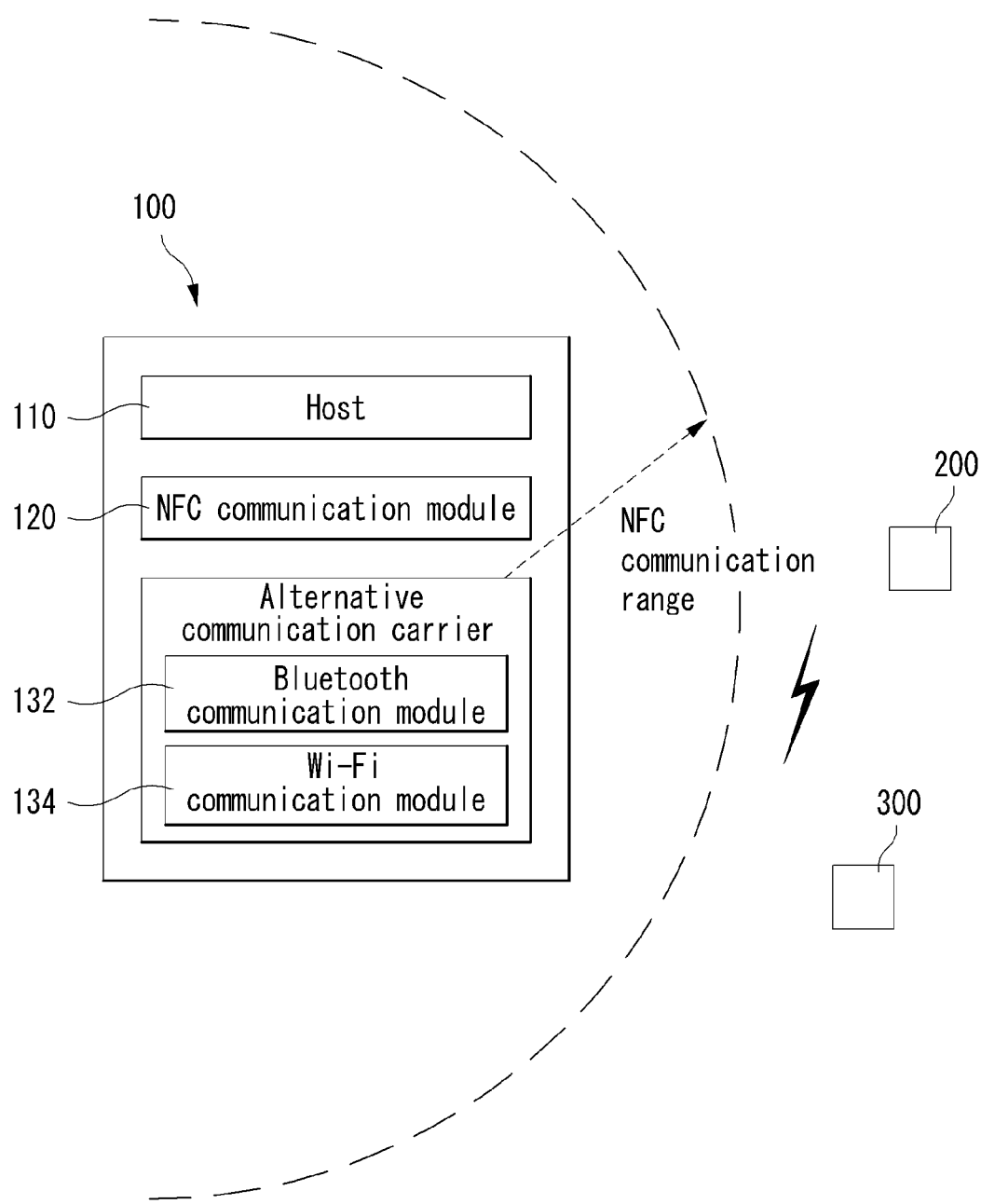
FIG. 1 shows a system environment according to an embodiment of the present invention.

The above and other objects, features, and advantages will be more apparent from the detailed description taken in conjunction with the accompanying drawings. Embodiments of the present invention will be described with reference to the accompanying drawings. Throughout the specification, the same reference numerals may be used to denote the same or substantially the same elements. The detailed description on known functions or configurations associated with the invention will be omitted when determined to render the gist of the invention unnecessarily unclear.

FIG. 1 shows a system environment according to an embodiment of the present invention.

The system environment may include one or more NFC electronic devices that may form an NFC link.

Referring to FIG. 1, the system environment may include one or more electronic devices 100, 200, and 300. This configuration is not necessary and thus more or less components may be included. As used herein, the electronic devices 100, 200 and 300 refer to any electronic devices that support NFC communication, such as, for example, NFC-supported mobile data processing devices (e.g., cell phones, smartphones, or e-book readers), printers, TVs, DTVs, computers, tablets, audio devices, or any other electronic devices. These are merely examples of the electronic devices and further various types of electronic devices may be included. Hereinafter, the electronic devices may be referred to as "NFC electronic devices".

As shown in FIG. 1, the electronic device 100 may include a host 110, an NFC communication module 120, and one or more alternative communication carriers.

The host 110 may provide a function of a process that controls the components of the electronic device 100. For example, the host 110 may receive and/or output various signals for controlling one or more alternative communication carriers and the NFC communication module 120 shown in FIG. 1. Hereinafter, the host 110 may be referred to as a processor 110 or a controller.

The NFC communication module 120 may allow the electronic device 100 to form an NFC link with the other electronic devices 200 and 300 that support NFC communication. The NFC communication module 120 may refer to an NFC forum device. As used herein, the NFC communication module may be referred to as a near field communication means.

As shown in FIG. 1, the NFC communication module 120 may form an NFC link by performing tagging with the NFC communication modules of the other electronic devices within an NFC communication range.

The NFC communication module 120 may communicate with the NFC communication modules of the other electronic devices 200 and 300 in various modes, such as, for example, a card emulation mode, a reader mode, a peer-to-peer mode.

When operating in the card emulation mode, the NFC communication module 120 of the electronic device 100 may function as a card, that is, a tag. In such case, the NFC communication modules of the other electronic devices may operate in the reader mode to obtain data from the NFC communication module 120 of the electronic device 100.

When operating in the reader mode, the NFC communication module 120 of the electronic device 100 may function as a reader. In this case, the NFC communication module 120 of the electronic device 100 may obtain data from the NFC communication modules of the other electronic devices.

When operating in the peer-to-peer mode, the NFC communication module 120 of the electronic device 100 may exchange data with the NFC communication modules of the other electronic devices.

The mode of the NFC communication module 120 may be determined according to a predetermined criterion. For example, the mode of the NFC communication module 120 may be set according to a user's entry or a predetermined algorithm.

The alternative communication carrier refers to a communication technology that may be used for data transmission between electronic devices. The alternative communication carrier may include various communication modules other than the NFC communication carrier. For example, as shown in FIG. 1, the alternative communication carrier may include at least one of a Bluetooth (802.15.1 IEEE) communication module 132 and a Wi-Fi (Wireless Fidelity) communication module 134. Besides, the alternative communication carrier may include various communication means such as an RFID (Radio Frequency Identification) communication module or a WiGig (Wireless Gigabit) communication module. Any communication means currently implemented or to be implemented in the future may also be included in the alternative communication carrier. Hereinafter, the alternative communication carrier may be referred to as an alternative carrier or an alternative communication means.

Although not shown, the electronic devices 200 and 300 may each include a configuration corresponding to the electronic device 100. That is, the electronic devices 200 and 300 each may include a host, an NFC communication module, and an alternative communication carrier.

For convenience of description, as necessary, the electronic device 100 is referred to as a first electronic device 100, the electronic device 200 as a second electronic device 200, and the electronic device 300 as a third electronic device.

After forming the NFC link with the other electronic devices through the NFC communication module 120, the electronic device 100 forms another type of communication link different from the NFC link to continue to perform data communication with the other electronic devices. As used herein, a series of procedures of allowing the electronic device 100 to be linked to the other electronic devices through the alternative communication carrier so that the electronic device 100 may keep communicating with the other electronic devices through the alternative communication carrier after the NFC link is formed are referred to as "handover".

In other words, the handover is to form an NFC link between the electronic device 100 and the other electronic devices and then form a link through the alternative communication carrier to perform data communication. A user may easily form an NFC link through NFC tagging between the electronic device 100 and the other electronic device, then changing communication means through the alternative communication carrier appropriate for transmission of a high capacity of data and/or data transmission in a longer distance than that of the NFC link.

Hereinafter, referring to the drawings, the handover according to an embodiment will be described in more detail. For convenience of description, the system environment shown in FIG. 1 is referred to. However, this is merely for ease of description, and the technical spirit of the invention is not limited to a particular environment or specific machine.

Figure 2:
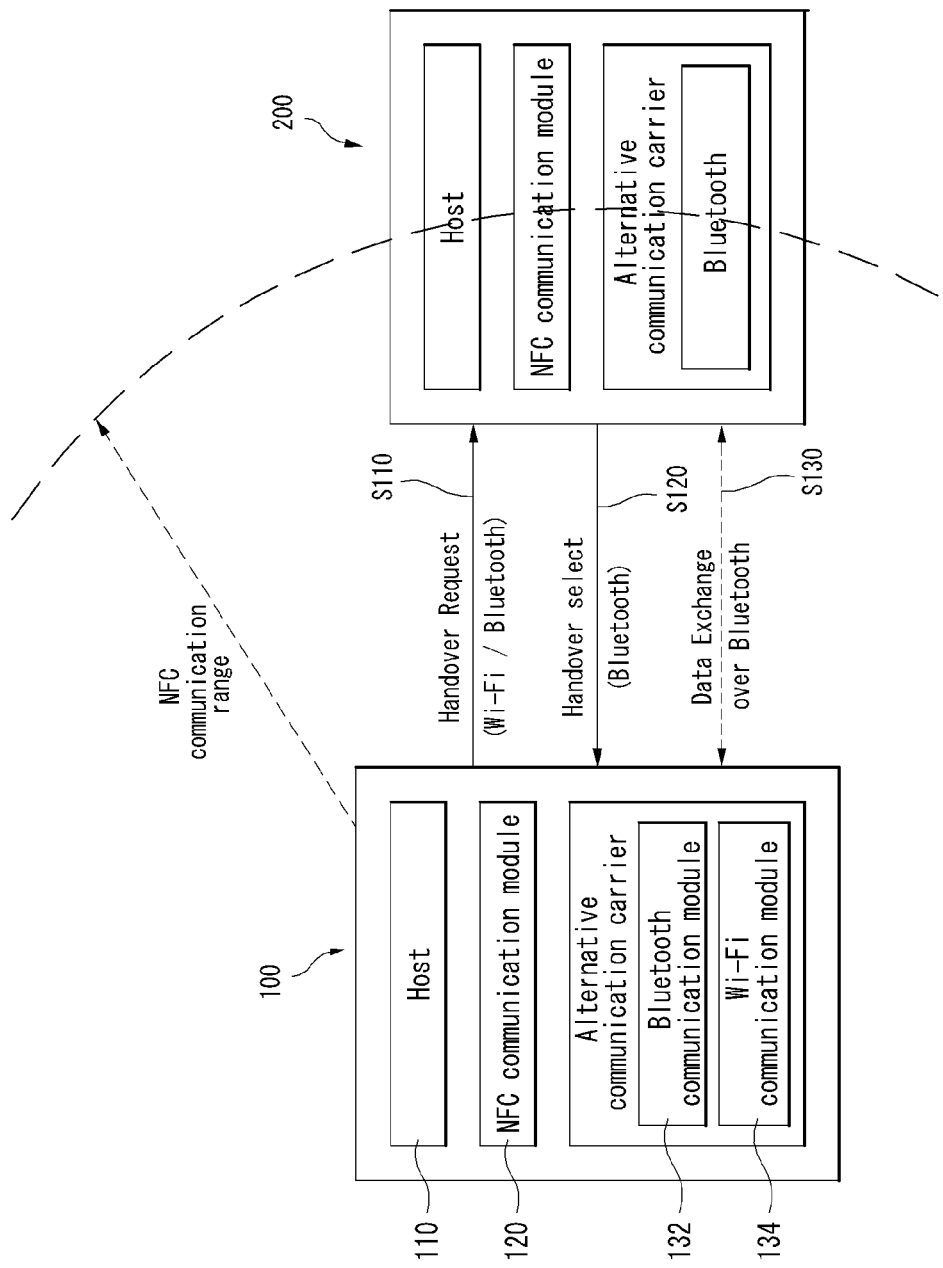
FIG. 2 is a view for describing the handover according to a first embodiment of the present invention.

FIG. 2 is a view for describing the handover according to a first embodiment of the present invention.

Referring to FIG. 2, the first electronic device 100 may transmit a handover request message to the second electronic device 200 (S110).

Prior to step S110, the first electronic device 100 and the second electronic device 200 may form a communication link through a first communication means. For instance, the first electronic device 100 may form an NFC link with the second electronic device 200 through tagging.

The first electronic device 100 may transfer a message for requesting handover, e.g., the handover request message, to the second electronic device 200 through the NFC link thusly formed.

The first electronic device 100 may transmit the handover request message to the second electronic device 200, and the second electronic device 200 may initiate a protocol for forming another communication link through the NFC link formed between the first electronic device 100 and the second electronic device 200.

Specific information included in the handover request message will be described later.

Here, the first electronic device 100 may serve as a handover requester, and the second electronic device 200 may serve as a handover selector. The handover requester refers to a device that starts a handover protocol by transmitting the handover request message to another NFC electronic device, and the handover selector refers to an NFC device that configures a handover selection message and responds to the handover request message. That is, the handover requester (i.e., a device of requesting a handover) and the handover selector (i.e., a device of selecting a handover) are relative concepts that are defined depending on whether to transmit a handover request message or handover selection message. Accordingly, depending on the situation, when the second electronic device 200 transmits a handover request message to the first electronic device 100, the first electronic device 100 becomes the handover selector, and the second electronic device 200 becomes the handover requestor.

The handover request message may include information associated with an alternative carrier supported by the first electronic device 100. For example, as shown in FIG. 1, since the first electronic device 100 supports Bluetooth and Wi-Fi, the handover request message may include information on Bluetooth and Wi-Fi supported by the first electronic device 100. A specific data format included in the handover request message will be described later.

Priorities may be assigned to a plurality of alternative carriers. For example, as shown in FIG. 2, the handover request message puts information on an alternative carrier having a higher priority at the front and information on an alternative carrier having a lower priority at the rear. Referring to the handover request message illustrated in FIG. 2, it can be seen that Wi-Fi, an alternative carrier, has a higher priority than Bluetooth. Or, there may be a separate field in which a priority of each carrier is filled.

Receiving the handover request message, the second electronic device 200 may transmit a response to the handover request message to the first electronic device 100 (S120).

For example, the second electronic device 200 may generate a handover selection message as an example of a response to the handover request message through the NFC link and may transmit the generated handover selection message to the first electronic device 100.

The second electronic device 200 may determine which alternative carrier is supported by the second electronic device 200 among the alternative carriers included in the handover request message and depending on the determination may provide information on the alternative carrier supported by the second electronic device 200 to the first electronic device 100. That is, the alternative carrier included in the handover selection message may include information on the alternative carrier supported by the second electronic device 200 among the alternative carriers supported by the first electronic device 100.

As shown in FIG. 2, the second electronic device 200 supports Bluetooth as an alternative carrier, but not Wi-Fi.

In such case, the handover selection message may include information on a Bluetooth communication module supported by the second electronic device 200 as information on the alternative carrier.

Specific information included in the handover selection message will be described later.

The first electronic device 100 may perform data communication with the second electronic device 200 through the alternative carrier (S130).

For this, the first electronic device 100 may obtain information on the alternative carrier supported by the second electronic device 200 by receiving the handover selection message from the second electronic device 200. For example, the first electronic device 100 may identify that the alternative carrier supported by the second electronic device 200 as obtained is Bluetooth.

Accordingly, based on the information obtained by transmission and reception of the handover request message and the handover selection message, the first electronic device 100 may perform a series of procedures for handover to a carrier other than the second electronic device 200. For example, to change the NFC link to a Bluetooth link, Bluetooth pairing may be carried out between the first electronic device 100 and the second electronic device 200. By doing so, the first electronic device 100 and the second electronic device 200 may switch from the NFC link to the Bluetooth link and may continue to perform communication based on the Bluetooth protocol.

As the link between the first electronic device 100 and the second electronic device 200 switches from the NFC link to the Bluetooth link, although not positioned in the NFC communication range any longer, the first electronic device 100 and the second electronic device 200 may still perform data communication and exchange data at a higher speed than that of the NFC link.

In other words, in the case that the first electronic device 100 is a smartphone, a user may place his smartphone near the second electronic device 200 so that the smartphone may conduct tagging with the second electronic device 200, thus forming an NFC link and performing the handover protocol to thereby change the link means to Bluetooth. Since the link means is changed, even when the user brings his smartphone out of the NFC communication range, the smartphone may continue to perform data communication with the second electronic device 200 through Bluetooth.

The handover process described in connection with steps S110 to S130 are hereinafter referred to as "negotiated handover". That is, the negotiated handover refers to exchange of messages for agreement on the alternative carrier used for data exchange between two first NFC electronic devices 100, e.g., the electronic devices 100 and 200. As used herein, the handover may refer to the negotiated handover.

Hereinafter, another embodiment of the above-described negotiated handover will be described.

Figure 3:
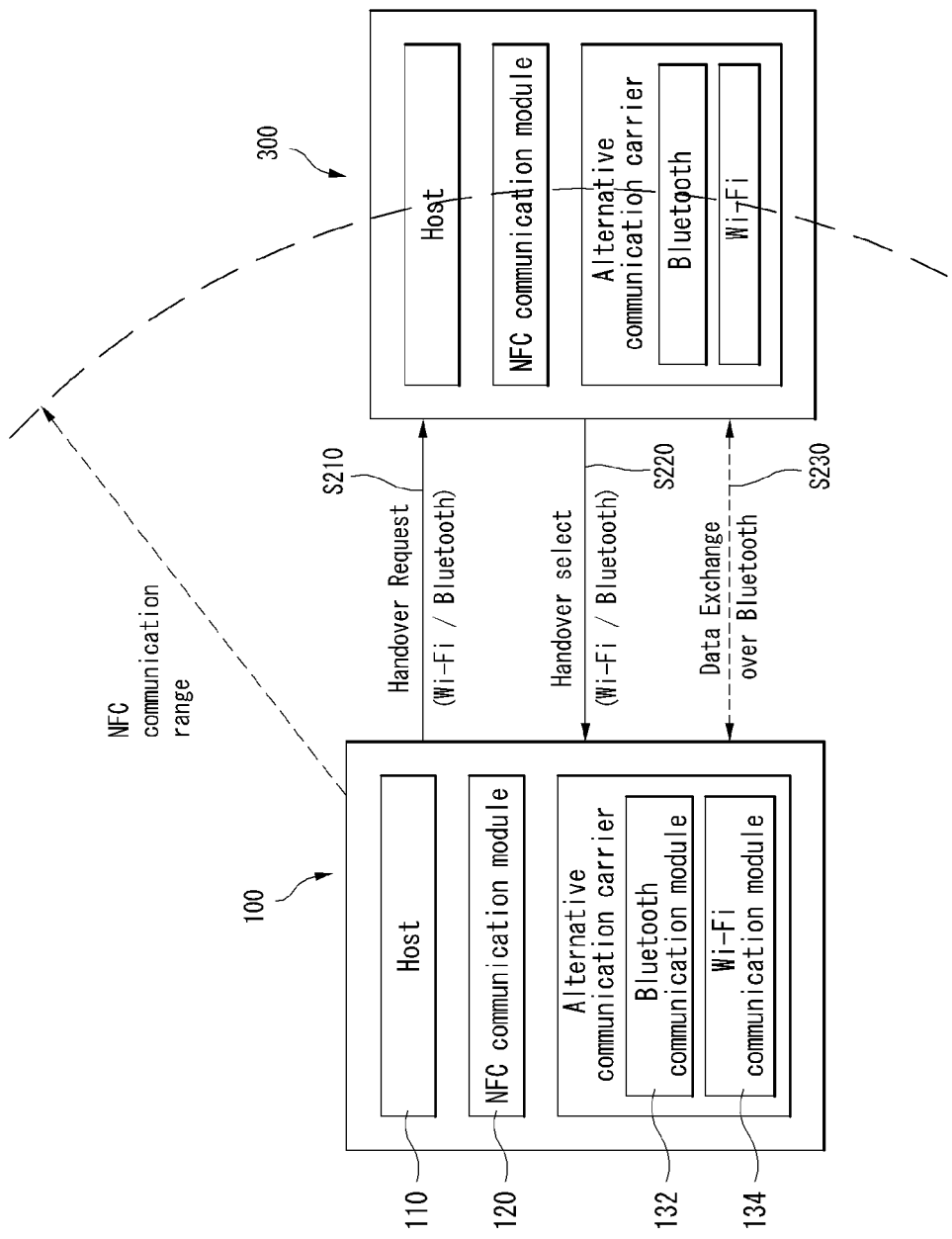
FIG. 3 is a view for describing a handover according to a second embodiment of the present invention.

FIG. 3 is a view for describing a handover according to a second embodiment of the present invention.

In describing the handover according to the second embodiment, what is substantially the same as the first embodiment will not be repeatedly described.

Referring to FIG. 3, the third electronic device 300, unlike the second electronic device 200 shown in FIG. 2, may simultaneously support a plurality of alternative carriers, for example, Bluetooth and Wi-Fi.

The first electronic device 100 may transmit a handover request message to the third electronic device 300 (S210). In other words, the first electronic device 100 becomes a handover requester, and the third electronic device 300 becomes a handover selector. Step S210 is the same as step S110 described in connection with FIG. 2, and the description will be omitted.

The third electronic device 300 may transmit a handover selection message to the first electronic device 100 in response to the handover request message (S220).

The handover selection message transmitted by the third electronic device 300 may include information on Wi-Fi and Bluetooth which are alternative carriers. Also, the handover selection message, as shown in FIG. 3, places Wi-Fi before Bluetooth, thereby assigning a higher priority to Wi-Fi.

The first electronic device 100 may communicate with the third electronic device 300 through the alternative carrier (S230).

The first electronic device 100 may judge that the third electronic device 300 supports a plurality of alternative carriers based on the handover selection message obtained in step S120.

When the handover selector, i.e., the third electronic device 300, supports the plurality of alternative carriers, the first electronic device 100 may select one or all of the plurality of alternative carriers. Further, when selecting one of the alternative carriers, the first electronic device 100 may make the selection depending on the priorities of the alternative carriers designated by the third electronic device 300 or may select its preferred one irrespective of such priorities.

Referring to FIG. 3, the first electronic device 100 may select Bluetooth as the alternative carrier regardless of the priorities assigned to the alternative carriers by the third electronic device 300.

Figure 4:
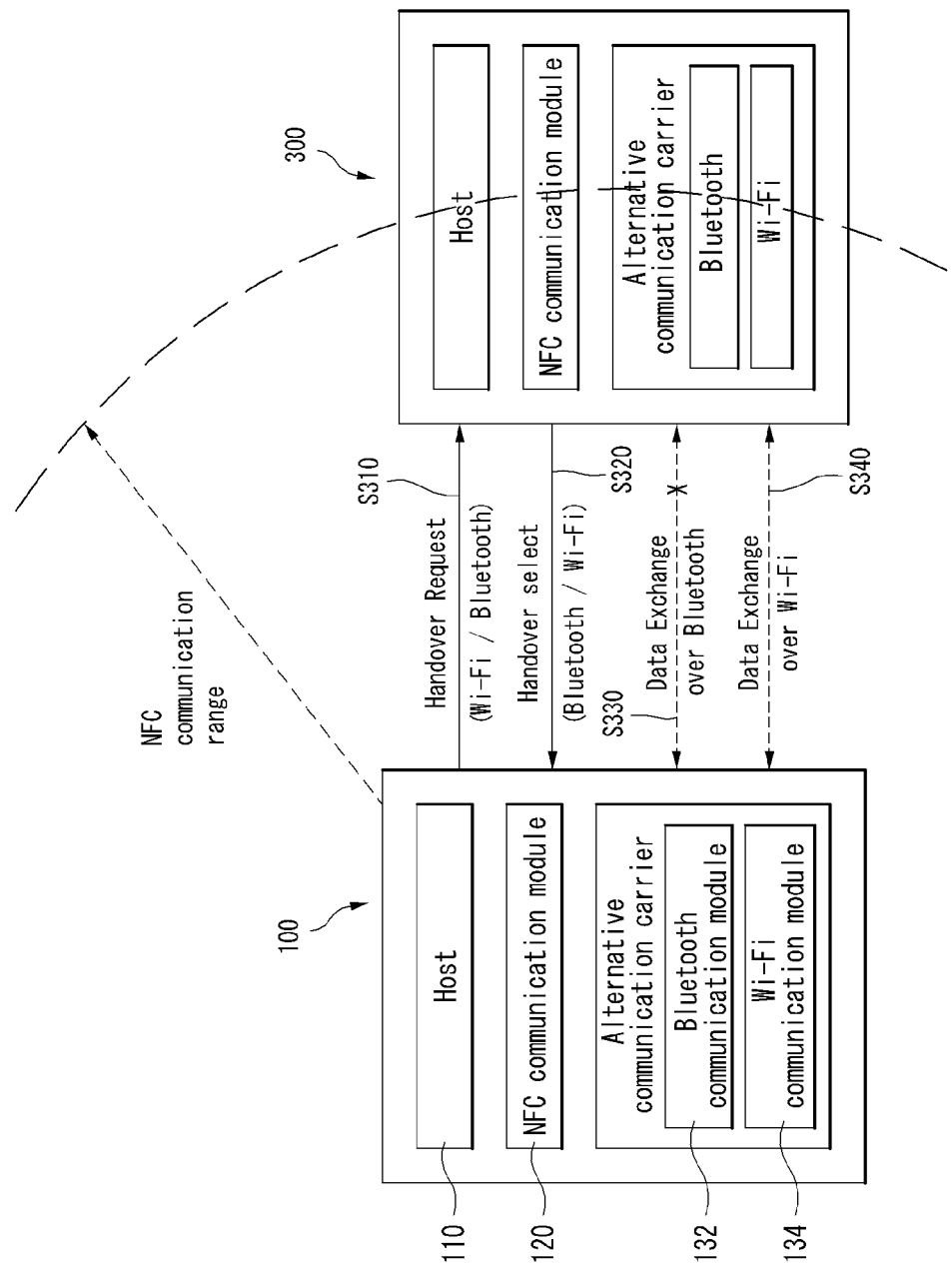
FIG. 4 is a view for describing a handover according to a third embodiment of the present invention.

FIG. 4 is a view for describing a handover according to a third embodiment of the present invention.

Step S310 of FIG. 4 is the same as step S210 of FIG. 3 and thus the detailed description will be omitted.

The third electronic device 300 may transmit a handover selection message to the first electronic device 100 (S330). At this time, as shown in FIG. 4, the handover selection message may assign a higher priority to Bluetooth than Wi-Fi.

In such case, the first electronic device 100 may first attempt Bluetooth pairing depending on the priorities designated by the third electronic device 300 which is a handover selector among a plurality of alternative carriers (S330).

The Bluetooth pairing may fail due to various causes. For example, while the handover protocol is in progress, if the first electronic device 100 and the third electronic device 300 are positioned out of a range of Bluetooth signals, the Bluetooth pairing may not succeed.

Meanwhile, while the handover protocol goes on, if the first electronic device 100 and the third electronic device 300 are positioned within the range of Bluetooth signals so that handover to Bluetooth occurs and while data exchange is conducted through the Bluetooth link, at least one of the first electronic device 100 and the third electronic device 300 is on the move so that the devices 100 and 300 end up departing from the Bluetooth signal range, the Bluetooth link may fail.

At this time, the first electronic device 100 may continue to perform data communication with the third electronic device 300 through Wi-Fi which is an alternative carrier with the next priority (S340).

Figure 5:
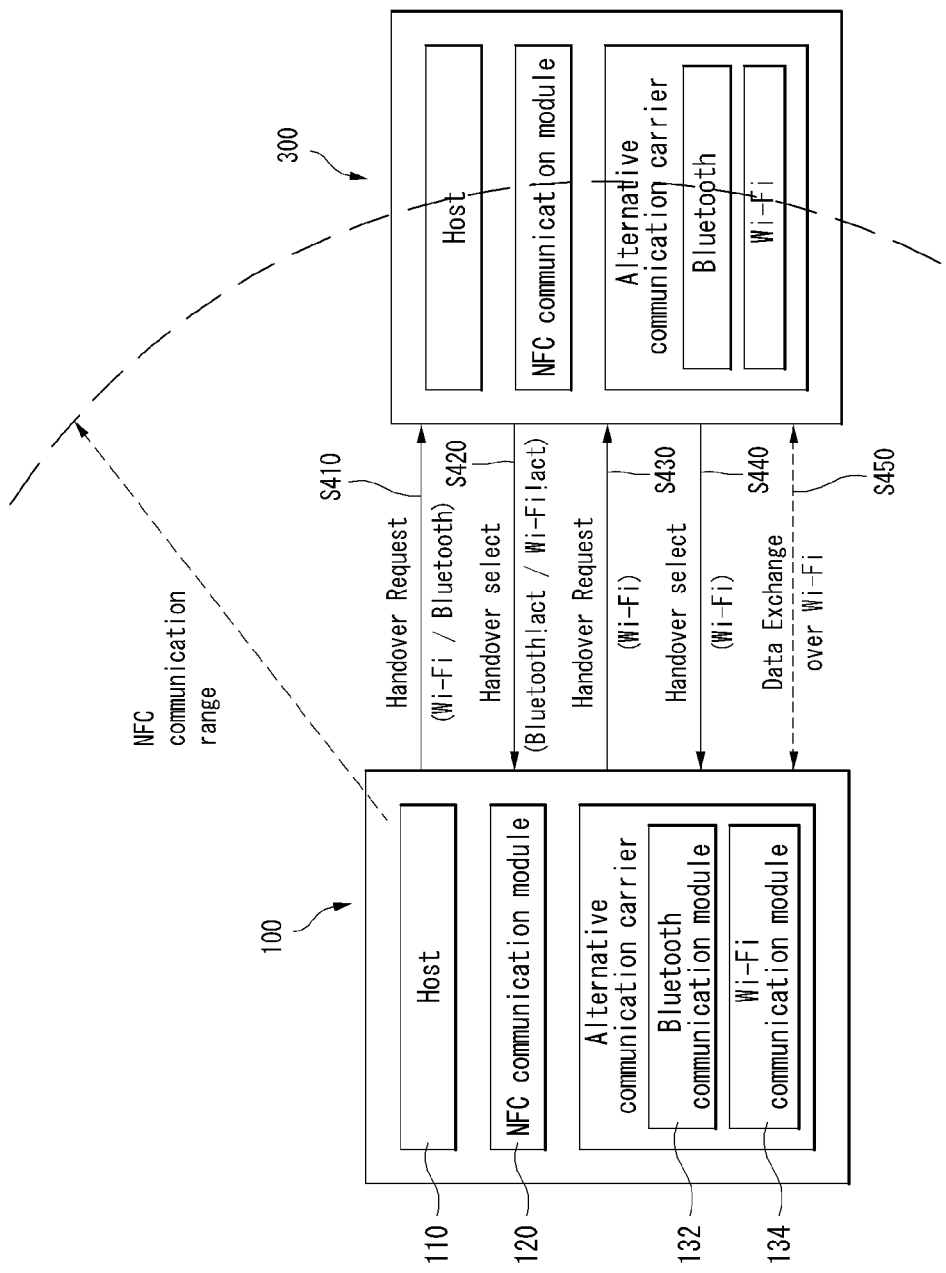
FIG. 5 is a view for describing a handover according to a fourth embodiment of the present invention.

FIG. 5 is a view for describing a handover according to a fourth embodiment of the present invention.

Step S410 of FIG. 5 is the same as step S310 of FIG. 4 and thus the detailed description will be omitted.

Referring to FIG. 5, the third electronic device 300 may transmit a handover selection message to the first electronic device 100 in response to a handover request message received from the first electronic device 100 (S420).

The handover selection message may include power condition information of alternative carriers provided by the third electronic device 300.

For example, if among alternative carriers supported by the first electronic device 100 are the alternative carrier supported by the third electronic device 300, then a power condition of each of the alternative carriers supported by the third electronic device 300—for example, information on activation or inactivation—may be transmitted from the third electronic device 300 to the first electronic device 100.

For example, as shown in FIG. 5, the handover selection message may include information indicating that Bluetooth and Wi-Fi, which are alternative carriers of the first electronic device 100, remain inactivated.

When the received handover selection message includes information on the plurality of alternative carriers, the first electronic device 100 may select any alternative carrier as described above. In this embodiment, it is assumed that the first electronic device 100 selects Wi-Fi as the alternative carrier.

The first electronic device 100 re-transmits the handover request message to the third electronic device 300 (S430). The handover request message transmitted in step S430 may designate one of the received plurality of alternative carriers. That is, the first electronic device 100 may designate Wi-Fi as the alternative carrier in step S430 and may transmit to the third electronic device 300 a handover request message designating Wi-Fi only as the alternative carrier, so that the Wi-Fi module of the third electronic device 300 may be activated.

In response to the handover request message received in step S430, the third electronic device 300 may activate power of the Wi-Fi module and may transmit a message responding to the handover request message received in step S430 to the first electronic device 100 (S440).

The first electronic device 100 may perform data exchange with the first electronic device 100 through Wi-Fi (S450).

In other words, when the Wi-Fi module of the third electronic device 300 is activated, the first electronic device 100 may form a Wi-Fi link with the third electronic device 300. That is, the first electronic device 100 may hand the NFC link with the third electronic device 300 over to the Wi-Fi link.

According to the embodiment described in connection with FIG. 5, the third electronic device 300, which is a handover selector, leaves the power of the alternative carrier inactivated until a specific alternative carrier is selected from the plurality of alternative carriers, thereby saving power.

A variety of handover processes have been so far described according to several embodiments. Hereinafter, a handover request collision that may occur during the course of handover and a solution thereto will be described in greater detail.

Figure 6:
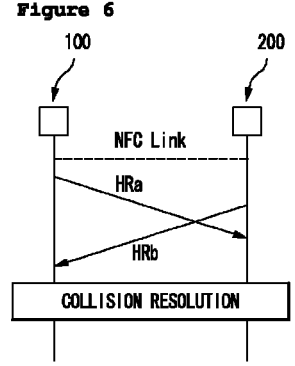
FIG. 6 is a view for describing a handover request collision according to an embodiment of the present invention.

FIG. 6 is a view for describing a handover request collision according to an embodiment of the present invention.

As used herein, the "handover request collision" refers to a situation where after an NFC link is formed between the first electronic device 100 and the second electronic device 200, the first electronic device 100 transmits a handover request message to the second electronic device 200, and the second electronic device 200 transmits a handover request message to the first electronic device 100—that is, both the first electronic device 100 and the second electronic device 200 send out respective handover request messages. In the embodiment described in connection with FIGS. 2 to 5, an electronic device functions as a handover requester, and its counterpart electronic device functions as a handover selector. However, when the handover request collision takes place, both the electronic devices function as the handover requesters.

Specifically, referring to FIG. 6, while an NFC link is formed between the first electronic device 100 and the second electronic device 200, the first electronic device 100 transmits a first handover request message HRa to the second electronic device 200 (S510).

The second electronic device 200 also transmits a second handover request message HRb to the first electronic device 100 (S520).

Based on the description made in connection with FIGS. 2 to 3, receiving the first handover request message HRa, the second electronic device 200 should transmit a handover selection message to the first electronic device 100 in response to the first handover request message HRa. However, since the second electronic device 200 transmits the second handover request message HRb to the first electronic device 100, a handover request collision occurs between the first electronic device 100 and the second electronic device 200 that both serve as the handover request devices.

In such case, one of the first electronic device 100 and the second electronic device 200 should be a handover selector. It is hereinafter referred to as "handover collision resolution" to determine which one of the first electronic device 100 and the second electronic device 200 is to be the handover selector.

The first electronic device 100 and the second electronic device 200 performs a handover collision resolution process (S530), which will be described below in more detail.

On the other hand, when receiving a handover request message from another electronic device before sending its own handover request message to the other electronic device, the first electronic device 100 processes the handover request message received from the other electronic device without sending its own handover request message to the other electronic device—that is, the first electronic device 100 plays a role as a handover selector—thereby achieving the handover process.

Hereinafter, the handover collision resolution performed by the first electronic device 100 and the second electronic device 200 in step S530 will be more specifically described. The handover collision resolution may be conducted by various methods. This will be described in detail with reference to the drawings.

Figure 7:
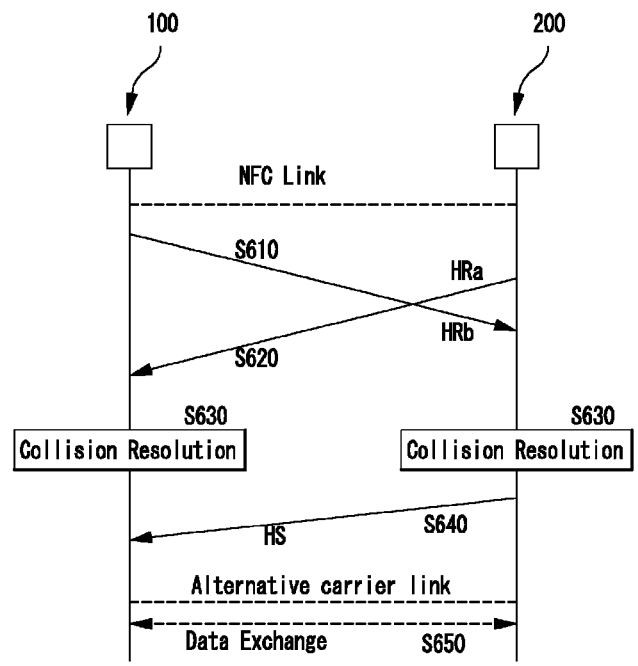
FIG. 7 is a view for describing a method of resolving the handover request collision according to a first embodiment of the present invention.

FIG. 7 is a view for describing a method of resolving the handover request collision according to a first embodiment of the present invention. In describing steps S610 and S620 of FIG. 7, what are the same as those described in connection with steps S510 and S520 will not be repeatedly described. Also, for ease of description, it is assumed that there is a handover request collision between the first electronic device 100 and the second electronic device 200. However, this is merely an example, and the technical spirit of the invention is not limited to a specific device.

The first electronic device 100 and the second electronic device 200 perform a handover request collision resolution (S630). That is, the first electronic device 100 and the second electronic device 200 may each perform the handover request collision resolution. Hereinafter, for convenience of description, the handover request collision solution by the first electronic device 100 is described, but the handover request collision resolution process may be also performed by the second electronic device 200 in the same manner.

The first electronic device 100 may compare a specific field value included in the first handover request message HRa transmitted with a specific field value included in the second handover request message HRb received.

For example, the specific field value may include a random number.

Specifically, when transmitting the first handover request message HRa to the second electronic device 200 in step S610, the first electronic device 100 generates the random number, includes the random number in the specific field value of the first handover request message HRa, and transmits the first handover request message HRa.

Upon transmitting the second handover request message HRb to the first electronic device 100 in step S620, the second electronic device 200 may also generate a random number and transmit the second handover request message HRb with the random number included in the specific field value of the second handover request message HRb.

By doing so, each of the first electronic device 100 and the second electronic device 200 may obtain the random numbers included in the handover request message received from its counterpart device and the handover request message transmitted to its counterpart device and may compare the random numbers with each other.

The first electronic device 100 may determine whether to function as a handover requester or handover selector by comparing the random number included in the first handover request message HRa transmitted to the second electronic device 200 with the random number included in the second handover request message HRb received from the second electronic device 200.

Depending on whether the two random numbers are identical to or different from each other, the first electronic device 100 may perform the following steps.

For example, when the two random numbers are the same as each other, the first electronic device 100 may re-transmit the handover request message to the second electronic device 200. The first electronic device 100 re-generate a random number and transmits the re-generated random number to the second electronic device 200 with the re-generated random number included in the specific field of the handover request message.

When the two random numbers are different from each other, the electronic device that has transmitted a handover request message having a higher priority may serve as the handover requester.

More specifically, to determine the priority, the first electronic device 100 may consider one or more bit values included in the transmitted first handover request message HRa and the received second handover request message HRb. For example, the one or more bit values may be bit values included at the same position in the random number.

That is, the first electronic device 100 may determine whether to function as the handover requester or handover selector depending on a result of comparing a specific bit value of the random number with a specific bit value of the received random number.

For example, the first electronic device 100 may determine based on the comparison result of the specific bit values whether the specific bit value transmitted from the first electronic device 100 is identical to or different from the specific bit value received from the second electronic device 200 and may determine whether to serve as the handover selector based on the result of the determination and the magnitudes of the transmitted random number and the received random number.

More specifically, for example, in the case that the comparison result of the specific bit values shows that the specific bit values are the same as each other, when the random number generated by the first electronic device 100 is larger than the random number generated by the second electronic device 200, the first electronic device 100 may function as the handover selector. In such case, since the specific bit values are the same as each other and the second electronic device 200 generates the random number smaller than that generated by the first electronic device 100, the second electronic device 200 may function as the handover requester.

Meanwhile, in the case that the comparison result of the specific bit values shows that the specific bit values are different from each other, when the random number generated by the first electronic device 100 is larger than the random number generated by the second electronic device 200, the first electronic device 100 may function as the handover requester. In such case, since the specific bit values are different from each other and the second electronic device 200 generates the random number smaller than that generated by the first electronic device 100, the second electronic device 200 may function as the handover selector.

That is, it may be determined which device is the handover requester or handover selector in consideration of both the comparison result of the specific bit values and the magnitudes of the random numbers, so that a device generating a larger/smaller random number may be prevented from being unconditionally selected as the handover requester or handover selector.

Hereinafter, it is assumed based on the handover request collision resolution that the first electronic device 100 functions as the handover requester, and the second electronic device 200 functions as the handover selector.

In response to the first handover request message HRa received in step S610, the second electronic device 200 may transmit a handover selection message to the first electronic device 100 (S640).

On the other hand, since the first electronic device 100 has been selected to function as the handover requester according to the handover request collision resolution, the first electronic device 100 does not respond to the second handover request message HRb received from the second electronic device 200 in step S620.

According to the handover selection message received from the second electronic device 200 in step S640, the first electronic device 100 may complete the handover process (S650). In other words, by performing the same process as the handover process described in connection with FIGS. 2 to 5, the first electronic device 100 may complete the handover process. Thus, the first electronic device 100 and the second electronic device 200 may exchange data through the alternative communication means.

Therefore, according to the embodiment described in connection with FIGS. 6 and 7, the collision that may occur during the course of the handover process may be effectively resolved.

Hereinafter, a data structure according to an embodiment of the present invention will be described in detail with reference to the drawings. The data structure is merely an example, and the technical spirit of the invention is not limited to a specific data structure.

FIG. 8 illustrates a structure of a handover message according to an embodiment of the present invention. As illustrated earlier in FIGS. 2 to 7, the message used in the handover process may include a handover request message and a handover selection message.

Referring to the upper part of FIG. 8, the handover request message according to an embodiment of the present invention may include a handover request record (hereinafter, "Hr record") and one or more NDEF (NFC Data Exchange Format) records. Also, the handover selection message (hereinafter, "Hs record") may include a handover selection record and one or more NDEF records.

The NDEF records may include specific information on the alternative carrier.

Specifically, various types of information may be included in the NDEF records of the handover request message.

For example, the NDEF records may include information for identifying an alternative communication link. That is, the handover carrier record may provide the handover selector with information on what alternative communication means is supported by the handover requester. As used herein, the NDEF record including the information for identifying an alternative communication link is referred to as a "handover carrier record".

Meanwhile, the NDEF records may include environment setup information for forming an alternative communication link. As used herein, the NDEF record including environment setup information necessary for forming an alternative communication link, such as a password or an address, is referred to as a "carrier environment setup record".

The carrier environment setup record may also include information for identifying what the alternative communication means is.

The handover carrier record and the carrier environment setup record will be described later in greater detail.

Referring to the middle part of FIG. 8, the handover request/selection record according to an embodiment of the present invention may include at least one of a header Hdr, a version field, and one or more alternative carrier records (hereinafter, "ac record"), and the alternative carrier records may define an alternative carrier requested/selected by the handover request/selection message. Further, the handover request/selection record may include more or less information fields that those illustrated therein.

Referring to the lower part of FIG. 8, the ac record according to an embodiment of the present invention may include at least one of a header Hdr, a carrier power state, a carrier data reference, an auxiliary data reference count, and information fields of one or more auxiliary data references.

The carrier data reference and the auxiliary data references may indicate their corresponding NDEF records as illustrated in the upper part of FIG. 8.

Hereinafter, the above-referenced information will be described in greater detail.

FIG. 9 illustrates an example of a handover request message according to an embodiment of the present invention.

As described in connection with FIGS. 2 to 7, the handover request message may be used for the handover requester to provide the handover selector with information for an alternative carrier supported by the handover requester.

The handover request message may include the handover request record and one or more NDEF records. For example, the handover request message may start with the handover request record and terminate with the NDEF record.

Specifically, the handover request message may start with the handover request record including a flag set as a message beginning MB and may terminate with the NDEF record with a flag set as a message end ME.

Since the handover request message should include at least one alternative carrier, it cannot have a record with both the MB and ME flags set.

The NDEF record may be one of the handover carrier record and the carrier environment setup record depending on characteristics of the alternative carrier. Also, the NDEF record may be configured as auxiliary data. The NDEF record will be described later more specifically.

FIG. 10 illustrates an example of a handover selection message according to an embodiment of the present invention.

As described in connection with FIGS. 2 to 7, the handover selection message may be used for the handover selector to provide the handover requester with information for an alternative carrier supported by the handover selector among alternative carriers included in the handover request message received from the handover requester.

Referring to the upper part of FIG. 10, the handover selection message may have the same structure as that of the handover request message described in connection with FIG. 9.

Further, referring to the lower part of FIG. 10, the handover selection message may include a single record with both a message beginning MB and a message end ME set. That is, in such case, none of the alternative carriers supported by the handover requester are supported by the handover selector.

Hereinafter, the handover request record illustrated in FIGS. 8 and 9 will be described in greater detail.

Figure 11:
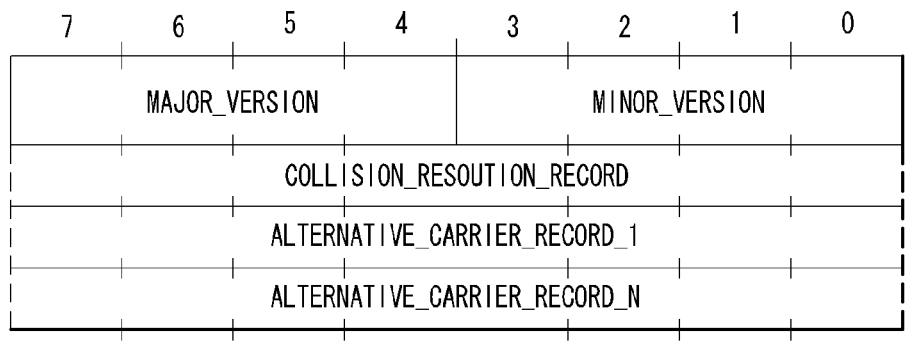
FIG. 11 illustrates an example of a handover request record according to an embodiment of the present invention.

FIG. 11 illustrates an example of a handover request record according to an embodiment of the present invention.

The handover request record may include a list of alternative carriers that may be used by the handover requester for communication with the handover selector.

The handover request record may indicate at least one or more alternative records.

Referring to FIG. 11, the handover request record may include information on at least one of major version, minor version, collision resolution record, and alternative carrier records 1 to n.

The collision resolution record may include random numbers for resolving the handover request collision as described in connection with FIG. 7.

Each alternative carrier record may specify an alternative carrier supported by the handover requester for communication between the handover selector and the handover requester. Information on the alternative carrier specified by each alternative carrier record may be included in the NDEF record of the handover request message.

Hereinafter, the handover selection record illustrated in FIGS. 8 and 10 will be described in greater detail.

Figure 12:
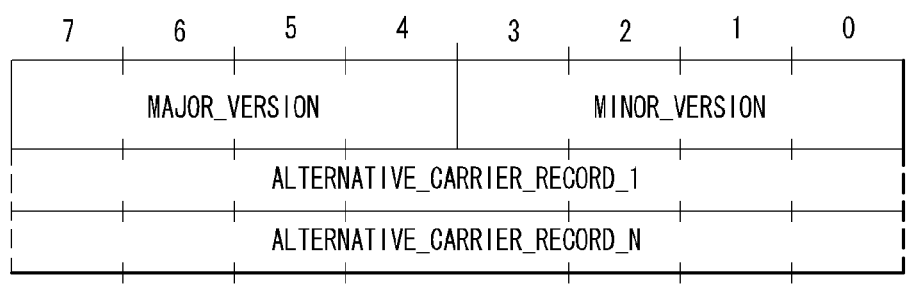
FIG. 12 illustrates an example of a handover selection record according to an embodiment of the present invention.

FIG. 12 illustrates an example of a handover selection record according to an embodiment of the present invention.

The handover selection record may include information on the alternative carrier supported by the handover selector among the alternative carriers included in the handover request message received from the handover requester by the handover selector.

As shown in FIG. 12, the handover selection record may include information on at least one of major version, minor version, and alternative carrier records 1 to n.

The alternative carrier records of the handover selection record may include information on the alternative carrier supported by both the handover requester and the handover selector.

Also, the order of the alternative carriers included in the handover selection record may refer to the order of priorities of the alternative carriers preferred by the handover selector. For example, the alternative carrier indicated by the alternative carrier record 1 may have a higher priority than that of the alternative carrier indicated by the alternative carrier record n. This may apply to the embodiment described in connection with FIGS. 3 to 5.

Hereinafter, the handover carrier record, which is an example of the NDEF record illustrated in FIGS. 8 and 9, will be described in greater detail.

Figure 13:
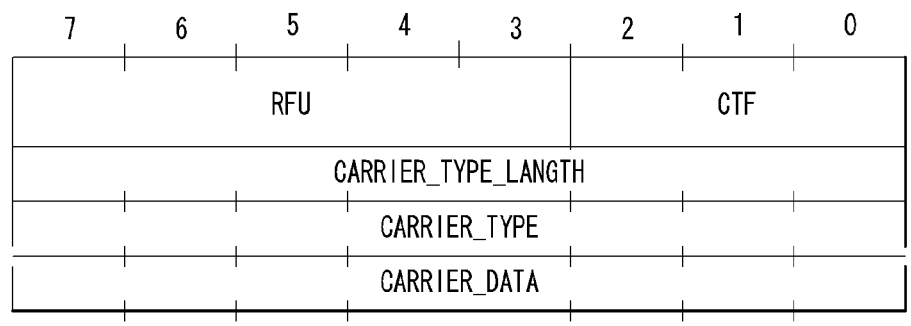
FIG. 13 illustrates an example of a handover carrier record according to an embodiment of the present invention.

FIG. 13 illustrates an example of a handover carrier record according to an embodiment of the present invention.

The handover carrier record may include information for identifying an alternative carrier.

Referring to FIG. 13, the handover carrier record may include at least one of a carrier type format (hereinafter, "CTF"), a carrier type length, a carrier type, and carrier data.

The carrier type format may indicate a structure of a value written in the carrier type to be described later.

For example, the carrier type format may correspond to at least one of an NFC Forum well-known type, a media-type defined in RFC 2046, an absolute URI defined in RFC 3986, and an NFC external type.

The carrier type length may refer to the length of the carrier type to be described later.

The carrier type may provide a unique identifier for an alternative carrier. The value of the carrier type should follow a structure, encoding, and format according to the carrier type format.

Based on at least one of the carrier type format, carrier type length, and carrier type—more specifically, the carrier type, the handover selector may identify what alternative carrier is supported by the handover requester.

The carrier data may include additional information on the alternative carrier.

Meanwhile, the handover carrier record may be included in the handover request message as the NDEF record of the handover request message. Receiving the handover carrier record, the handover selector may transmit to the handover requester environment setup information for the alternative carrier identified by the handover carrier record, for example, the handover selection message including the carrier environment setup record. Receiving the carrier environment setup record, the handover requester may perform handover according to the environment setup information included in the carrier environment setup record.

Hereinafter, the alternative carrier record (ac Record) illustrated in FIGS. 8 and 12 will be described in greater detail.

Figure 14:
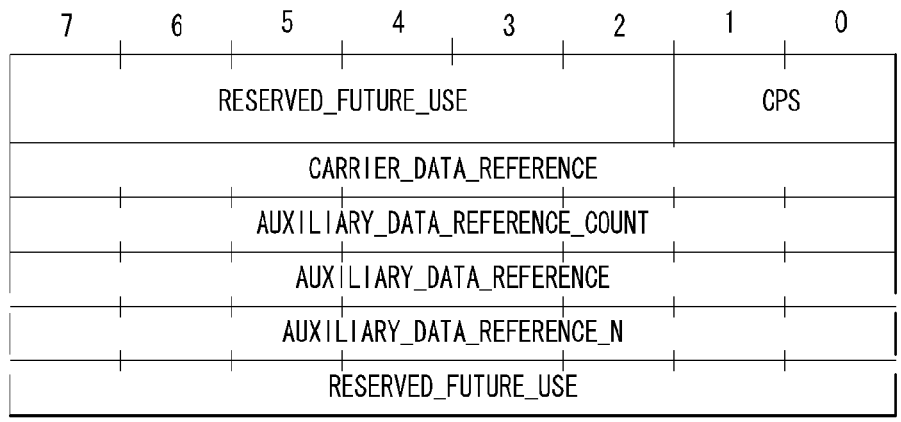
FIG. 14 illustrates an example of an alternative carrier record according to an embodiment of the present invention.

FIG. 14 illustrates an example of an alternative carrier record according to an embodiment of the present invention.

The alternative carrier record may be included in the handover request record or the handover selection record.

As shown in FIG. 14, the alternative carrier record may include at least one of a carrier power state CPS, a carrier data reference CARRIER_DATA_REFERENCE, an auxiliary data reference count AUXILIARY_DATA_REFERENCE_COUNT, and auxiliary data references 1 to n AUXILIARY_DATA_REFERENCE 1 TO N.

The carrier power state refers to the power state of the alternative carrier. The carrier power state may be at least one of, e.g., "inactivated", "activated", "under activation", and "unknown".

The carrier power state may apply to step S420 described in connection with FIG. 5.

The carrier data reference may provide a function of indicating the NDEF record illustrated in the upper part of FIG. 8. As described earlier, the NDEF record may be the handover carrier record or carrier environment setup record.

The auxiliary data reference count may refer to the number of auxiliary data references that follow.

The auxiliary data reference may indicate the NDEF record that provides additional information on the alternative carrier.

The message structure has been so far described.

Hereinafter, an example of information included in the message structure will be described according to the type of the alternative carrier.

Figure 15:
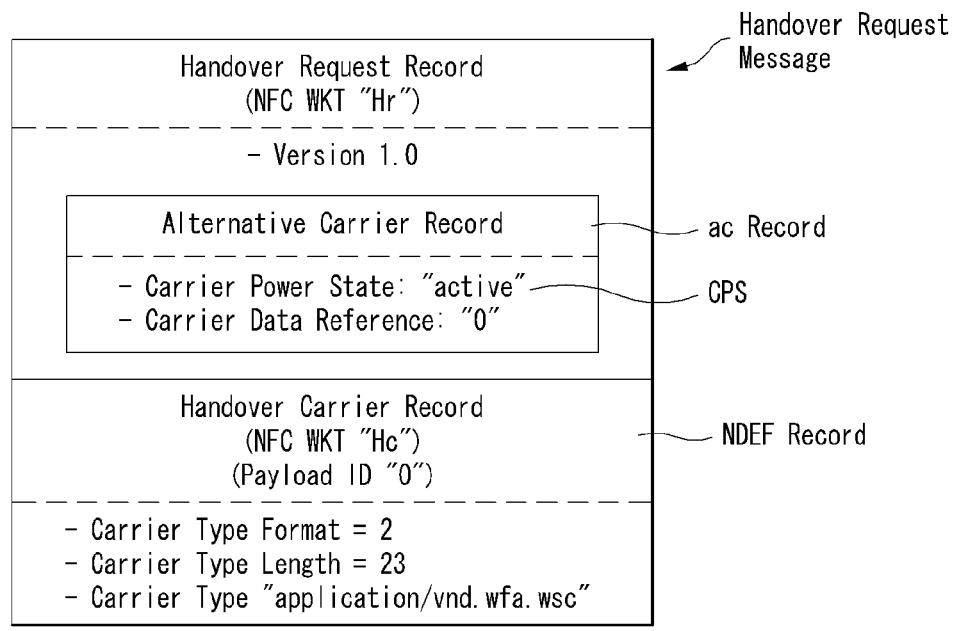
FIG. 15 illustrates an example of a handover request message when the alternative carrier is Wi-Fi according to an embodiment of the present invention.

FIG. 15 illustrates an example of a handover request message when the alternative carrier is Wi-Fi according to an embodiment of the present invention. As illustrated in FIG. 15, the handover request message may include the handover request record and the handover carrier record. That is, as described above, when the handover requester designates Wi-Fi as the alternative carrier, the NDEF record may have a format of the handover carrier that may include information for identifying Wi-Fi.

FIG. 16 illustrates a binary content of the Wi-Fi handover request message according to an embodiment of the present invention. That is, FIG. 16 illustrates another representation for the handover request message shown in FIG. 15.

Figure 17:
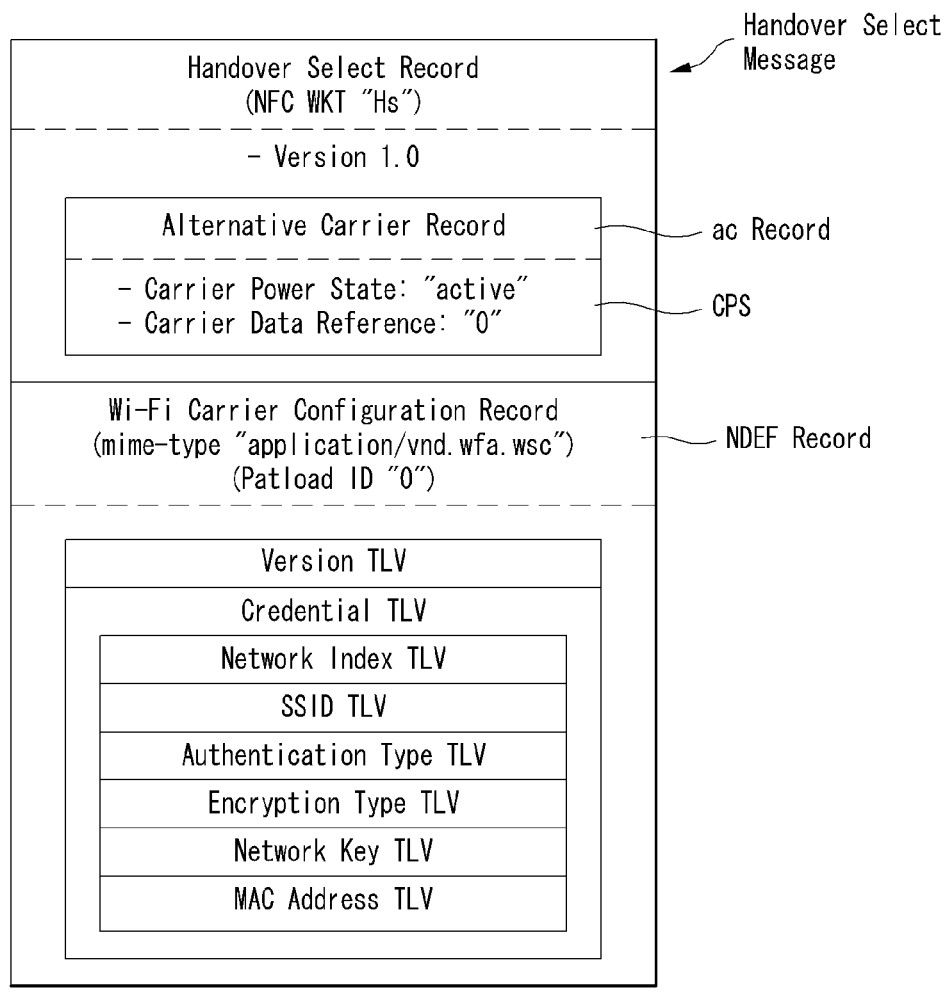
FIG. 17 illustrates a handover selection message when the alternative carrier is Wi-Fi according to an embodiment of the present invention.

FIG. 17 illustrates a handover selection message when the alternative carrier is Wi-Fi according to an embodiment of the present invention. As shown in FIG. 17, the handover selection message may include the handover selection record and the carrier environment setup record. That is, the carrier environment setup record is an example of the NDEF record described in connection with FIG. 8.

Referring to FIG. 17, the carrier environment setup record provided by the handover selector may include environment setup information necessary for the handover requester to access the alternative carrier provided by the handover selector, for example, information on service set identifier (SSID), authentication type TLV, encryption type TLV, network key, and MAC address TLV.

In other words, based on the information included in the handover carrier record received from the handover requester, the handover selector identifies that the alternative carrier supported by the handover requester is Wi-Fi, when the handover selector supports Wi-Fi, generates environment setup information necessary for the handover requester to form a Wi-Fi link with the handover selector, and transmits the generated environment setup information with the environment setup information included in the carrier environment setup record.

The handover requester may access the alternative carrier provided by the handover selector, for example, Wi-Fi, based on the carrier environment setup information received from the handover selector.

FIG. 18 illustrates a binary content of a handover selection message according to an embodiment of the present invention. That is, FIG. 18 shows another representation of the handover selection message illustrated in FIG. 17.

Although the embodiment described in connection with FIGS. 15 to 18 assumes that the alternative carrier is Wi-Fi, the embodiments may also apply to any type of alternative carriers in which the handover requester need not provide the alternative carrier environment setup information to the handover selector.

The handover request/selection messages that may be implemented when the alternative carrier is Wi-Fi have been described so far in connection with FIGS. 15 to 18. This may also apply to the embodiment described in connection with FIGS. 2 to 7.

Hereinafter, information including the handover request/selection messages when the alternative carrier is Bluetooth will be described with reference to the drawings.

Figure 19:
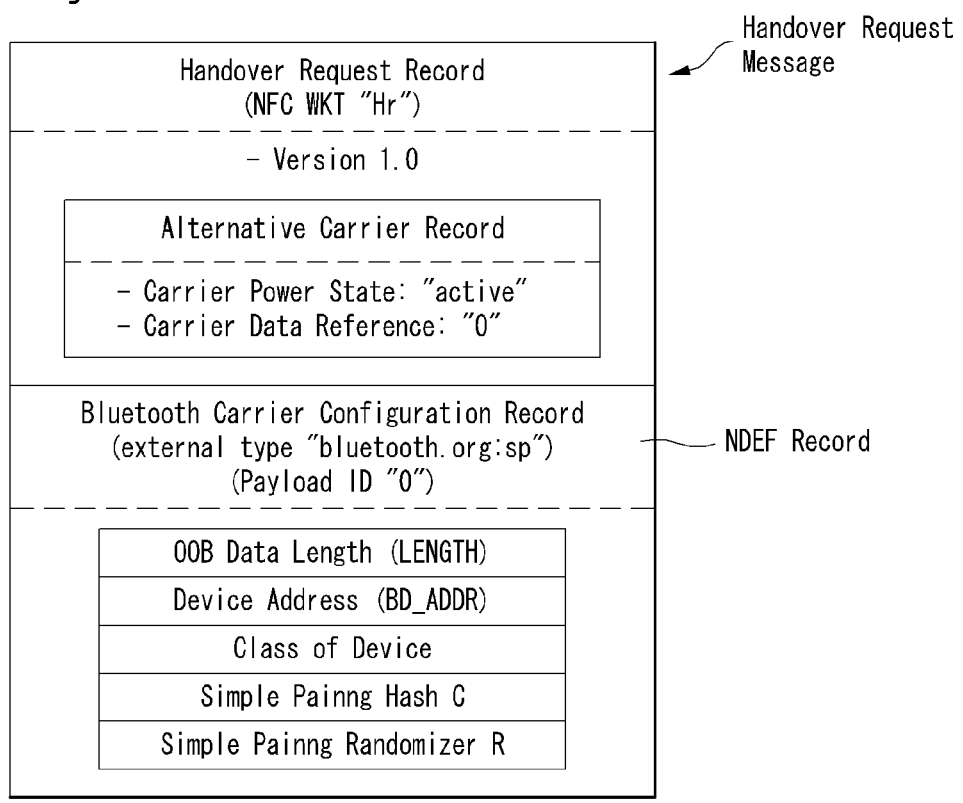
FIG. 19 illustrates an example of a handover request message when the alternative carrier is Bluetooth according to an embodiment of the present invention.

FIG. 19 illustrates an example of a handover request message when the alternative carrier is Bluetooth according to an embodiment of the present invention. Referring to FIG. 19, the handover request message may include the handover request record and the carrier environment setup record.

As shown in FIG. 19, the carrier environment setup record may include environment setup information necessary for the handover selector to access the alternative carrier provided by the handover requester, for example, Bluetooth. Meanwhile, even when the alternative communication means is Bluetooth, if there is no security means for Bluetooth, the carrier environment setup record of the handover request message may be replaced with the handover carrier record.

The information illustrated in FIG. 19 is apparent to those skilled in the art, and the detailed description is thus omitted.

FIG. 20 illustrates a binary content of a Bluetooth handover request message according to an embodiment of the present invention. That is, FIG. 20 shows another representation of the handover request message of FIG. 19.

Figure 21:
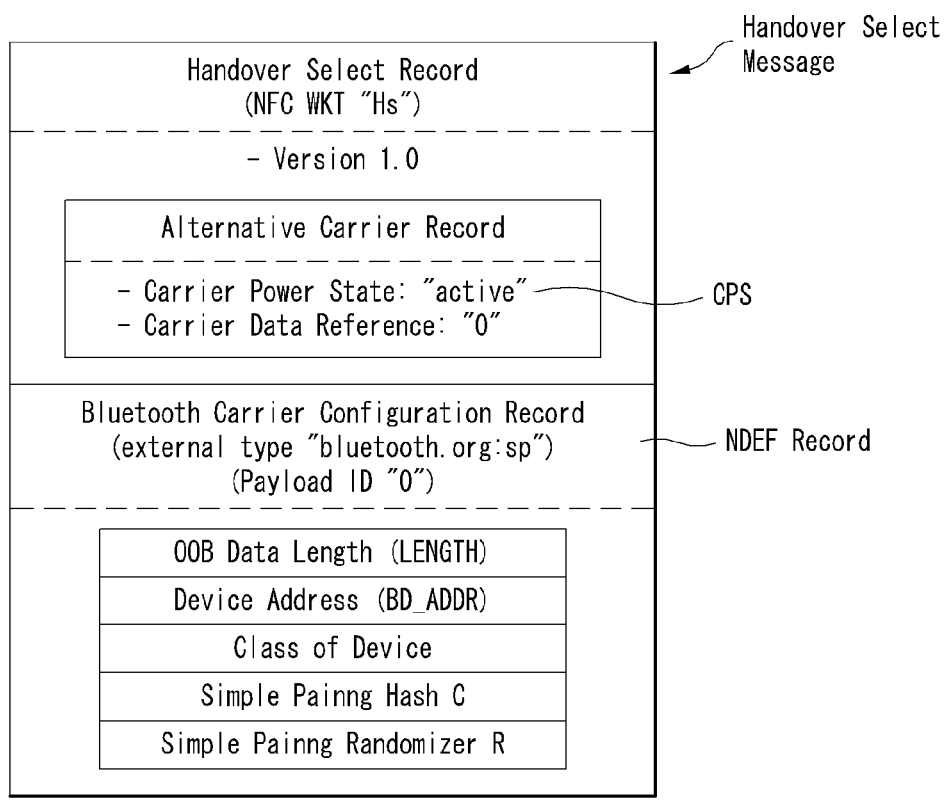
FIG. 21 illustrates an example of a handover selection message when the alternative carrier is Bluetooth according to an embodiment of the present invention.

FIG. 21 illustrates an example of a handover selection message when the alternative carrier is Bluetooth according to an embodiment of the present invention.

FIG. 21 illustrates an example of a handover selection message when the alternative carrier is Bluetooth according to an embodiment of the present invention. Referring to FIG. 21, the handover selection message may include the handover selection record and the carrier environment setup record.

As shown in FIG. 21, the carrier environment setup record may include environment setup information necessary for the handover requester to access the alternative carrier provided by the handover selector, for example, Bluetooth.

FIG. 22 illustrates a binary content of a Bluetooth handover request message according to an embodiment of the present invention. That is, FIG. 22 illustrates another representation of the handover selection message shown in FIG. 21.

Although the embodiments described in connection with FIGS. 19 to 22 assume that the alternative carrier is Bluetooth, the technical spirit of the invention is not limited to a specific carrier.

Further, although the embodiments described in connection with FIGS. 15 to 22 assume that one alternative carrier is provided, a plurality of alternative carriers may also be provided as illustrated in FIGS. 2 to 5. In such case, the handover request/selection messages shown in FIGS. 15 to 22 may each include information on a plurality of alternative carriers.

Hereinafter, a method of performing a handover will be described using the auxiliary data described in connection with FIG. 8.

Figure 23:
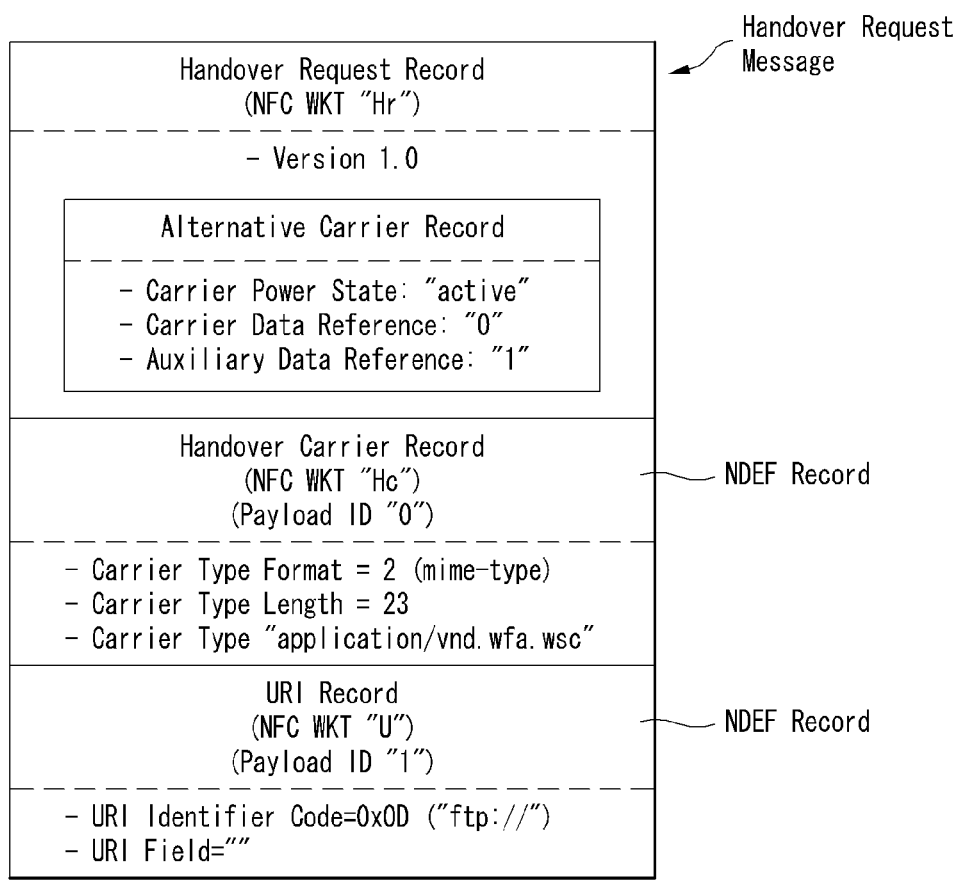
FIG. 23 illustrates an example of a handover request message using additional data according to a first embodiment of the present invention.

FIG. 23 illustrates an example of a handover request message using additional data according to a first embodiment of the present invention. The handover requester and the handover selector may open an FTP (File Transfer Protocol) session using the auxiliary data at the same time with handover. In this embodiment, the alternative carrier is assumed to be Wi-Fi.

Referring to FIG. 23, the handover request message may include a handover request record, a URI (Uniform Resource Identifier) record, and a handover carrier record which is an example of the NDEF record.

Referring to the handover request record illustrated in FIG. 23, the carrier data reference is 0, and the auxiliary data reference is 1. That is, the handover carrier record has payload ID 0, and the auxiliary data has payload ID 1. In other words, the URI record whose payload ID is 1 may belong to the auxiliary data.

The handover carrier record is the same as that described in connection with FIG. 15, and the detailed description is thus omitted.

The URI record which is the auxiliary data represents that the handover requester may perform the FTP. For example, the handover request message includes auxiliary data associated with the FTP so that it may be known to the handover selector that the handover requester supports the FTP.

Figure 24:
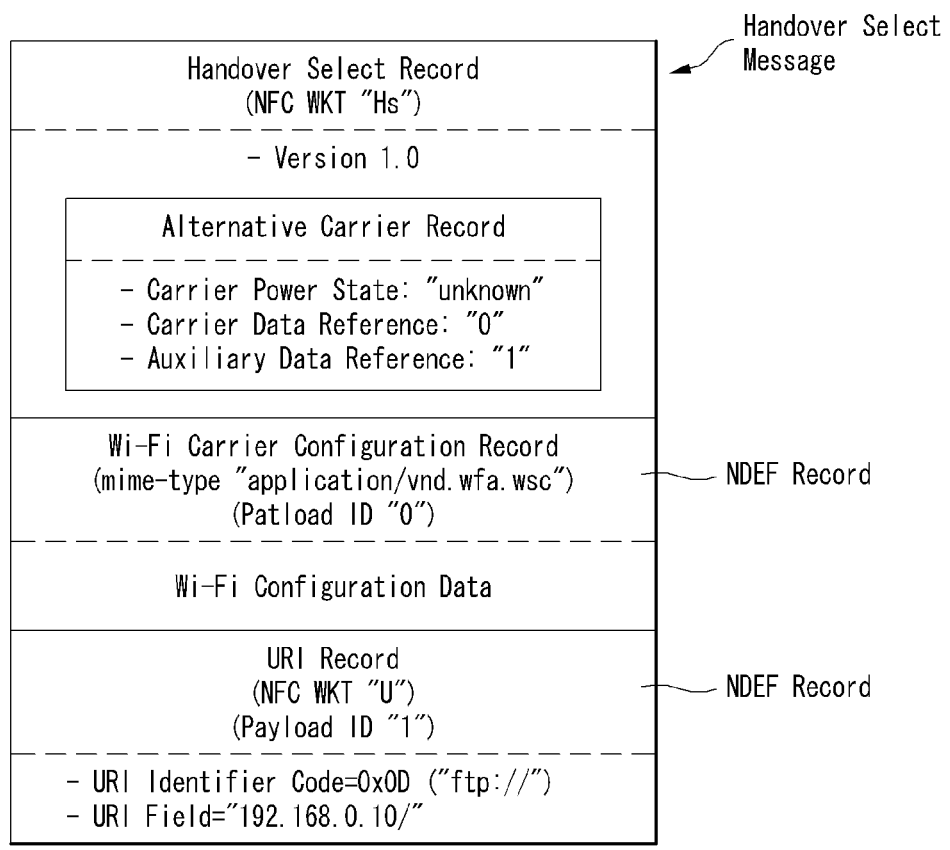
FIG. 24 is a view for describing an example of a handover selection message using additional data according to a first embodiment of the present invention.

FIG. 24 is a view for describing an example of a handover selection message using additional data according to a first embodiment of the present invention.

Referring to FIG. 24, the handover selection message may include a handover selection record, a URI record, and a Wi-Fi carrier environment setup record which is an example of the NDEF record.

Referring to FIG. 24, the URI record which is auxiliary data may include a URI field value for opening an FTP session.

By doing so, the handover requester may open the FTP session simultaneously with performing handover with the handover selector from the NFC link to Wi-Fi link.

Hereinafter, referring to FIGS. 25 and 26, there will be described a method of obtaining information on devices connected to the handover selector through an alternative carrier designated by the handover requester by the handover requester utilizing additional data together with handover.

Figure 25:
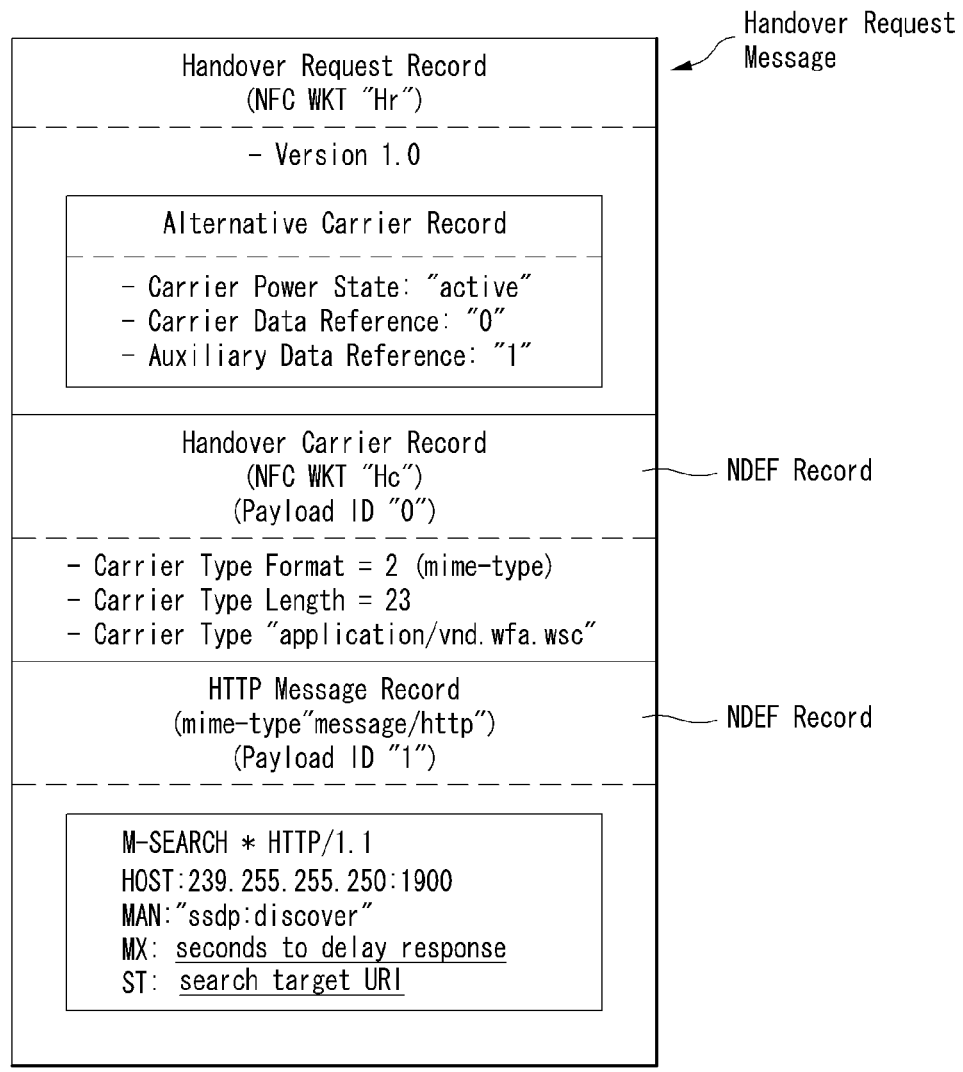
FIG. 25 illustrates a handover request message utilizing additional data according to a second embodiment of the present invention.

FIG. 25 illustrates a handover request message utilizing additional data according to a second embodiment of the present invention. In this embodiment, the alternative carrier is assumed to be Wi-Fi.

Referring to FIG. 25, the handover request message may include a handover request record, an HTTP message record, and a handover carrier record which is an example of the NDEF record.

The handover request message shown in FIG. 25 allows for recognition of a device linked through Wi-Fi to the handover selector while a request of handover to Wi-Fi is simultaneously made to the handover selector. For example, the device connected through Wi-Fi to the handover selector may include devices configuring a home network or an office network. For example, the home network or office network may be implemented by UPnP (Universal Plug & Play). The Wi-Fi network is merely an example, and any other networks constituted of other alternative carriers may be included.

The HTTP message record illustrated in FIG. 25 includes a message, e.g., M-search message, used for the devices in the UPnP network to recognize each other.

Further, the HTTP message record illustrated in FIG. 25 may include the type of a device to be searched by the handover requester. For example, the HTTP message record may include information on the type of a Wi-Fi connected device, for example, UPnP device. The type of the UPnP device may be designated by the ST (Search Target) illustrated in FIG. 25. The type of the UPnP device may include a variety of types, such as renderer, server, printer, or scanner. The ST field may designate the type of one or more UPnP devices to be searched, for example, a printer and a renderer, or may designate all types of the UPnP devices. When all types of UPnP devices are designated, the ST field may have a value of ssdp: all.

Hereinafter, the ST field of the HTTP message record is assumed to designate all types of UPnP devices, i.e., ssdp: all.

FIG. 26 illustrates additional data of a handover selection message utilizing additional data according to a second embodiment of the present invention.

FIG. 26 illustrates an example of additional data transmitted to the handover requester in response to the handover request message received by the handover selector.

Referring to FIG. 26, the additional data transmitted from the handover selector to the handover requester includes information on a Wi-Fi connected UPnP device which is an alternative carrier. For example, the information on the UPnP device may include a USN (Unique Service Name) for identifying the service name and a device identifier. The device identifier, as shown in FIG. 26, may be represented as UUID.

The handover requester performs handover to Wi-Fi while simultaneously obtaining information a Wi-Fi connected device, e.g., UPnP device, through the handover selector. By doing so, the handover selector may recognize the UPnP device which is part of the UPnP network in a more simplified manner.

The various embodiments disclosed herein may be implemented alone or in combination thereof. Further, the steps constituting one of the embodiments may be implemented in combination with the steps constituting another of the embodiments. For example, the handover protocols described in connection with FIGS. 2 to 5 may be combined with each other. Further, the handover collision resolution protocol described herein may also apply to each of the handover protocols described in connection with FIGS. 2 to 5.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

Industrial Applicability

According to the present invention, there may be provided an electronic device that may effectively resolve handover request collisions to thereby perform handover from an NFC link to an alternative communication link and a method of operating the electronic device.

The invention claimed is:

1. A method of resolving a handover collision of a first electronic device, the method comprising:
   transmitting through a first communication link to a second electronic device a first handover request message to request formation of a second communication link that has a different type from a type of the first communication link;
   receiving from the second electronic device through the first communication link a second handover request message to request formation of a third communication link that has a different type from the type of the first communication link; and comparing a first random number included in the first handover request message with a second random number included in the second handover request message, wherein the first random number and the second random number are used for resolving the handover collision.

2. The method of claim 1, wherein when the first random number and the second random number are same, the comparing operation further comprises:

generating a third handover request message; and transmitting the generated third handover request message to the second electronic device.

3. The method of claim 1, wherein when the first random number and the second random number are different, the comparing operation further comprises:

comparing a first specific bit included in the first random number with a second specific bit included in the second random number.

4. The method of claim 3, further comprising:

determining that the first electronic device performs a function as a handover selector when the first specific bit and the second specific bit are same and the first random number is greater than the second random number; and transmitting a first response message to the second electronic device in response to the second handover request message.

5. The method of claim 4, wherein the first response message includes alternative carrier information, the alternative carrier information indicating a single carrier that is used as an alternative communication means.

6. The method of claim 5, wherein the alternative carrier information includes carrier power state information, the carrier power state information indicating a power status of a carrier corresponding to the alternative carrier information.

7. The method of claim 6, wherein the carrier power state information includes at least active status information, inactive status information, activating status information, or unknown status information.

8. The method of claim 3, further comprising:

determining that the first electronic device performs a function as a handover selector when the first specific bit and the second specific bit are different and the first random number is smaller than the second random number; and transmitting a first response message to the second electronic device in response to the second handover request message.

9. The method of claim 8, wherein the first response message includes alternative carrier information, the alternative carrier information indicating a single carrier that is used as an alternative communication means.

10. The method of claim 9, wherein the alternative carrier information includes carrier power state information, the carrier power state information indicating a power status of a carrier corresponding to the alternative carrier information.

11. The method of claim 10, wherein the carrier power state information includes at least active status information, inactive status information, activating status information, or unknown status information.

12. A first electronic device comprising:

a transmitter configured to transmit through a first communication link to a second electronic device a first handover request message to request formation of a second communication link that has a different type from a type of the first communication link;

a receiver configured to receive, from the second electronic device through the first communication link, a second handover request message to request formation of a third communication link that has a different type from the type of the first communication link; and a controller configured to compare a first random number included in the first handover request message with a second random number included in the second handover request message, wherein the first random number and the second random number are used for resolving the handover collision.

13. The first electronic device of claim 12, wherein the controller is further configured to:

generate a third handover request message when the first random number and the second random number are same; and control the transmitter to transmit the generated third handover request message to the second electronic device.

14. The first electronic device of claim 12, wherein the controller is further configured to compare a first specific bit included in the first random number with a second specific bit included in the second random number when the first random number and the second random number are different.

15. The first electronic device of claim 14, wherein the controller is further configured to:

determine that the first electronic device performs a function as a handover selector when the first specific bit and the second specific bit are same and the first random number is greater than the second random number; and control the transmitter to transmit a first response message to the second electronic device in response to the second handover request message.

16. The first electronic device of claim 15, wherein the first response message includes alternative carrier information, the alternative carrier information indicating a single carrier that is used as an alternative communication means.

17. The first electronic device of claim 16, wherein the alternative carrier information includes carrier power state information, the carrier power state information indicating a power status of a carrier corresponding to the alternative carrier information.

18. The first electronic device of claim 17, wherein the carrier power state information includes at least active status information, inactive status information, activating status information, or unknown status information.

19. The first electronic device of claim 14, wherein the controller is further configured to:

determine that the first electronic device performs a function as a handover selector when the first specific bit and the second specific bit are different and the first random number is smaller than the second random number; and control the transmitter to transmit a first response message to the second electronic device in response to the second handover request message.

20. The first electronic device of claim 19, wherein the first response message includes alternative carrier information, the alternative carrier information indicating a single carrier that is used as an alternative communication means.

21. The first electronic device of claim 20, wherein the alternative carrier information includes carrier power state information, the carrier power state information indicating a power status of a carrier corresponding to the alternative carrier information.

22. The first electronic device of claim 21, wherein the carrier power state information includes at least active status information, inactive status information, activating status information, or unknown status information.

* * * * *